United States Patent Office 3,285,746
Patented Nov. 15, 1966

3,285,746
IRREVERSIBLE PHOTOTHERMOTROPIC COMPOSITIONS
Alvin M. Marks, 153—16 10th Ave., and Mortimer M. Marks, 166—25 Cryders Lane, both of Whitestone, N.Y.
Filed July 23, 1964, Ser. No. 384,750
7 Claims. (Cl. 96—90)

This application is a continuation-in-part of application Serial No. 206,943, filed July 2, 1962, now abandoned, which was a divisional application of Serial No. 63,824, filed October 20, 1960.

This invention relates to photothermotropic compositions and more particularly to films and coatings which will vary irreversibly in light transmission when exposed to light or heat.

The term "irreversible photothermotropic material," as used herein refers to a material which will become opaque upon exposure to light or heat and will not return to its original transparent state upon removal of the incident energy. The present invention, however, is concerned with irreversible photothermotropic compositions which may be utilized to advantage in photographic processes, and also in the form of films to shield eyes from sudden light flashes. These films are capable of producing an intensely dark color change upon being triggered by a wide range of incident photo or thermal energy from the ultra-violet to the infra-red, and whose sensitivity increases rather sharply to a high value beyond the threshold intensity.

Accordingly, it is an object of the present invention to provide irreversible photothermotropic materials which will rapidly become opaque upon exposure to ultra-violet, visible or infra-red light or heat of predetermined wavelength and energy range.

Another object of the present invention is to provide photothermotropic copy sheets.

A feature of the present invention is the provision of irreversible photothermotropic films in optimal combinations to respond sensitively to given wavelength ranges in the ultra-violet, visible and infra-red, or upon an increase in temperature.

The photothermotropic compositions described herein may be controlled to provide specific spectral absorption characteristics capable of triggering the reaction, and may be activated by ultra-violet, visible or infra-red radiation.

The invention consists of the construction, combination and arrangement of parts, as herein illustrated, described and claimed.

Certain applications such as expendable eye protecting shields or goggles can employ photothermotropic materials of the irreversible type. In accordance with the present invention, a highly efficient irreversible material for such applications may be made of certain complex heteropoly acids in polymers such as polyvinyl alcohol-acetate copolymer and polyvinyl butyral. Heteropoly acids suitable for use herein include phosphomolybdic acid, silicotungstic acid, and phosphovanadomolybdic acid.

In another embodiment of the present invention there is provided a photothermotropic copy-sheet which may be utilized to advantage in making copies of graphic originals by exposure to light or heat.

A composition comprising 30% by weight phosphomolybdic acid and 70% by weight polyvinyl alcohol-acetate copolymer, for example, shows an irreversible decrease in transmittance on simple heating or exposure to light above a threshold intensity. This material is suitable for irreversible opaquing uses since its transmittance changes from about 60–90% to less than 0.001 in the opaqued condition with remarkable uniformity throughout the entire spectrum from 300 to 1,000 mu.

Important spectral transmission and sensitivity differences can be achieved with certain heteropoly acids. For example, approximately 50% increased sensitivity beyond threshold is observed for silicotungstic acid relative to phosphomolybdic acid with polyvinyl alcohol-acetate copolymer. It has been discovered that optimal ratios are in the range of 25–75 parts of polymer to 75–25 parts of heteropoly acid.

Figure 1:
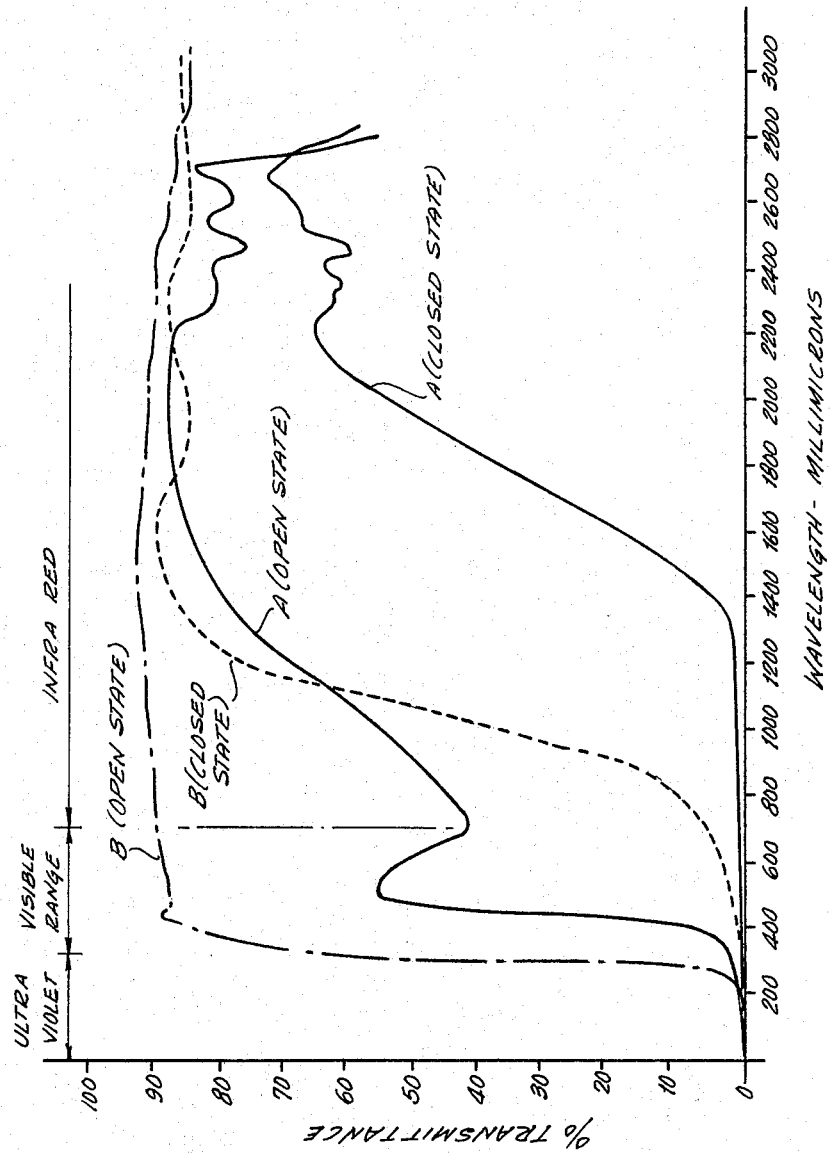
FIGURE 1 is a composite graph of transmittance versus wavelength for various photothermotropic compositions.

As shown in FIGURE 1, a composition of 60 parts phosphomolybdic acid and 40 parts of polyvinyl alcohol-acetate copolymer absorbs considerable ultra-violet light and blue light is absorbed from 300–375 mu. The material changes irreversibly from a slightly yellow transparent to a dark or black color when exposed to ultra-violet light, intense visible or infra-red light, or increased temperature, absorbing strongly from 200–1400 mu.

Films prepared from about 70% phosphomolybdic acid and 30% polyvinyl butyral are more sensitive than a corresponding film prepared from polyvinyl alcohol acetate copolymer.

A composition of 71 parts of phosphovanadomolybdic acid and 29 parts of polyvinyl butyral is a light yellow green shade of 71% initial transmittance, and opaques to a dark shade of 0.003% transmittance.

Curve B (FIGURE 1) is the spectrum of a photothermotropic composition of silicotungstic acid and polyvinyl alcohol-acetate copolymer. The spectrum indicates little absorption of ultra-violet light occurs for wavelengths greater than 375 mu, and complete absorption for wavelengths less than 320 mu. The film is colorless in the transparent state and black in the opaque state, absorbing practically all light from 200–900 mu.

Phosphotungstic acid-polyvinyl alcohol-acetate copolymer, on the other hand, absorbs at 400 mu. In the transparent state the color is light amber. The spectrum of this composition shows strong absorption of ultra-violet and near blue light to 450 mu and less absorption of light from 450 mu to 700 mu. There is virtually no absorption of infra-red beyond 750 mu.

A comparison of the color and spectral graphs of phosphomolybdic acids and the silicotungstic acids in polyvinyl alcohol-acetate copolymer show that these are qualitatively and quantitatively very different from phosphotungstic acid in the same polymer composition, and are also different from each other. For example, FIG- URE 2 shows a comparison of sensitivity versus light intensity for silicotungstic phosphomolybdic and phosphotungstic acids in polyvinyl alcohol acetate copolymer and in polyvinyl alcohol.

Sensitively is defined as the reciprocal of the total incident radiant energy of all wavelenghts to opaque a photothermotropic composition. Sensitivity is expressed in $(gm.\text{-}cals./cm.^2)^{-1}$.

Above a threshold intensity of 7.5 gm.-cals./cm.$^2$-min., the sensitivity suddenly increases to 1.40 for the silicotungstic acid polyvinyl alcohol acetate copolymer of the composition given in Example 2, and to a sensitivity of 0.95 for the phosphomolybdic acid polyvinyl alcohol acetate composition of Example 1. Above the threshold intensity, the film suddenly turns black.

A sensitivity versus intensity curve for a mixture of phosphomolybdic and silicotungstic acids in polyvinyl alcohol-acetate is shown in curve 2C, which corresponds to Example 3 and has a gradual increase in sensitivity above an intensity 6 gm.-cals./cm.$^2$-min. and reaches a maximum sensitivity of 0.70 at an intensity of 12 gm.-cals./cm.$^2$-min.

Sensitivity versus incident radiant intensity for a composition comprising phosphotungstic acid-polyvinyl alcohol-acetate is shown on curve 2D, showing almost zero sensitivity up to an intensity of 20 gm.-cals./cm.$^2$-min.

The stable irreversible black color complex of the phosphomolybdic, phosphovanado-molybdic, silicotungstic and polyvinyl alcohol-acetate compositions, appears to be due to a reduction of the heteropoly acid to an oxide which is then chelated by a bonding to the polymer chains. When the heteropoly acid is reduced to the oxide form, it becomes an active reactant for reactive functional groups of the polymer matrix and either cross-links or reduces the chain to an unsaturated state.

Figure 2:
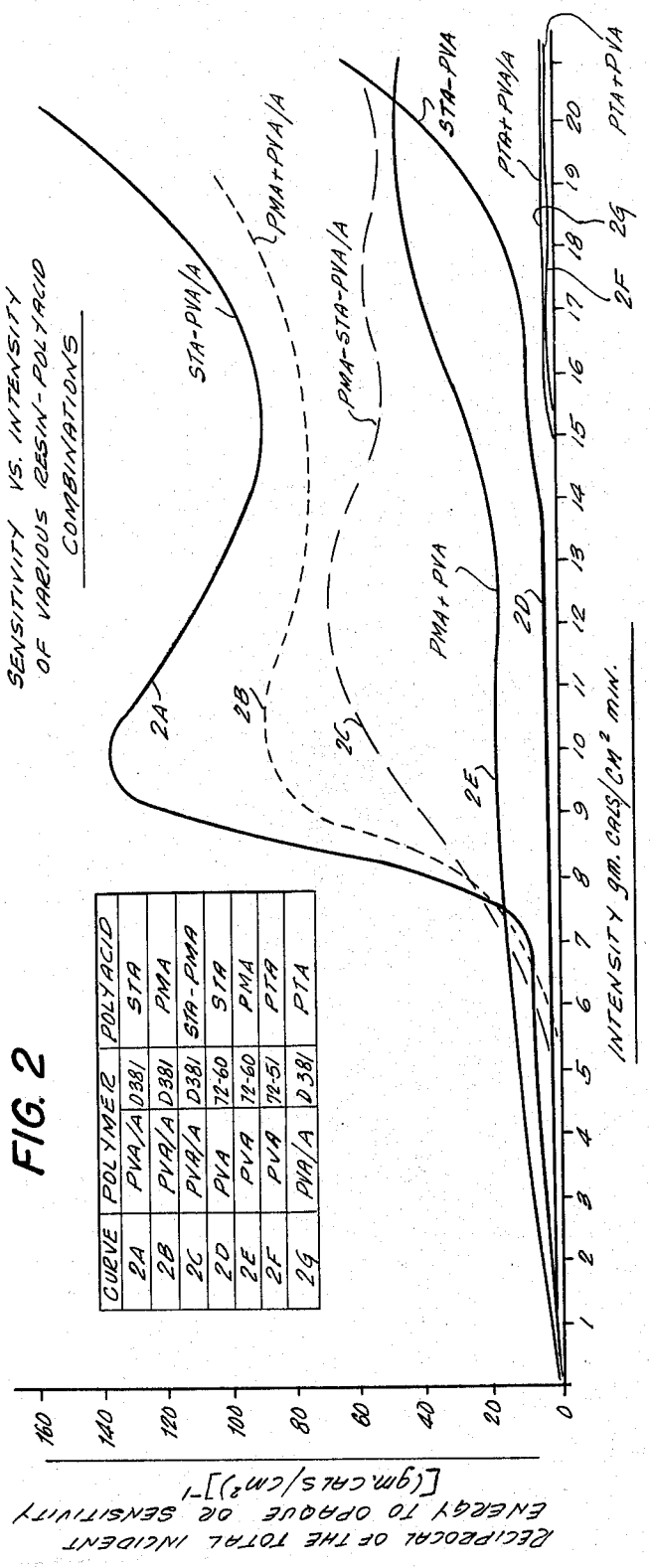
FIGURE 2 is a composite graph of sensitivity versus intensity for various photothermotropic compositions.

We have discovered that the chemical nature of the polymer groups employed affects the characteristics of the irreversible reaction. For example, fully hydrolyzed polyvinyl alcohol, such as sold by Du Pont and Company, under the trade name "Elvanol 72–60" or "Elvanol 72–51," does not exhibit the same irreversible photothermotropic reaction as described herein for polyvinyl alcohol-acetate. Specifically a composition of phosphotungstic acid and Elvanol 72–51 (FIGURE 2 curve 2E) was very insensitive to long exposure to a Sylvania sungun. Similarly, phosphomolybdic acid—"Elvanol 72–60" (curve 2E) and silicotungstic acid—"Elvanol 72–60" (FIGURE 2 curve 2D) also are relatively insensitive.

In a preferred form of the present invention, the photothermotropic compositions comprise 25–80 parts by weight of the heteropoly acid and between about 75–20 parts by weight of a polymer, preferably polyvinyl alcohol-acetate, or polyvinyl butyral.

The photothermotropic films of the present invention may be prepared by mixing the constituents of the compositions together in a suitable solvent, generally water or alcohol, and homogenizing by shaking. The mixture then is allowed to stand to eliminate bubbles and coated on a suitable support surface; for example to a thickness of approximately 0.0004″. The polymer constituent next is solidified by allowing the solvent to evaporate in the present of heat. Films of the required thickness may be prepared from the coating compositions of this invention, as illustrated by Examples 1 to 6 inclusive. Coatings may be made into a suitable support by roller, spinner, spray or other techniques well known in the art. The absorption constant of films of this invention, when opaque, is so high that a single thin coating of about 0.0005″ usually covers the range of 60–90% down to about $10^{-3}$ to $10^{-4}\%$ suitable to produce a film for photographic or protective goggle purposes.

Figure 3:
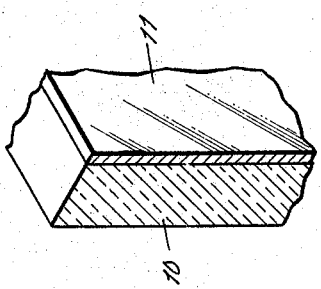
FIGURE 3 is a somewhat isometric view greatly enlarged of a photothermotropic article in accordance with the present invention.

The resultant photothermotropic film article is shown in FIGURE 3 in which 10 is the support such as glass plastic and the like, and 11 is the photothermotropic film.

FIGURE 3 is also representative of another embodiment of the invention referred to earlier herein, namely a photothermotropic copy-sheet. Such a sheet is useful in making copies of graphic originals by exposure to light or heat. In the case of a photothermotropic copy-sheet, the support 10 is ordinarily a paper or paper-like material, rather than glass, plastic, or the like. Paper and paper-like materials lend themselves more readily to production of an easily read graphic copy, while glass, clear plastic and similar materials are more suitable for eye-protective goggles and the like.

Whether the support be a transparent, glass-like film or a paper-like material, the photothermotropic film 11 is essentially the same, namely a film comprising a heteropoly acid dispersed in a resinous binder, as more fully described above.

The resin or polymer contains functional groups capable of reducing the heteropoly acid upon exposure to light or heat. In a preferred form of the invention, the active coating includes between about 25–80 parts by weight of phosphomolybdic acid in about 20–75 parts by weight of polyvinyl butyral.

From the transmittance-wavelength graphs A and B, shown in FIGURE 1 the composition which comprises phosphomolybdic acid and polyvinyl alcohol acetate copolymer (of Example 1 curve A) is seen to be more sensitive initially to ultra-violet, visible and infra-red light than the composition of Example 2 which comprises silicotungstic acid and polyvinyl alcohol acetate copolymer (curve B). This characteristic may be the reason for the sharper radiant intensity threshold with the latter (see FIGURE 2 curves 2A and 2B). When films prepared according to Example 2 start to decrease in transmittance, more and more energy is absorbed from 300–1,000 m$\mu$. and the process of darkening is then rapidly completed.

The following examples the constituents being given in parts by weight, illustrate the invention more fully:

*Example 1*

Prepare the following solutions by shaking or mixing:

1($a$)—Polymer solution:

| | |
|---|---:|
| Polyvinyl alcohol acetate copolymer [1] | 10 |
| Methanol | 40 |
| Propanol | 40 |
| Water | 10 |
| | 100 |

[1] Shawinigan Resin Co. "D381."

1($b$)—Heteropoly acid solution:
A 30% solution wt./wt. of phosphomolybdic acid in propanol.

| Solution Number | Solids | Percent Solidi | Solution Total |
|---|---|---|---|
| 1($a$) | 7.0 | 70 | 70 |
| 1($b$) | 3.0 | 30 | 30 |

Phosphomolybdic acid solution 1($b$) is added to polyvinyl alcohol acetate solution 1($a$). The combined mixture is shaken or mixed, filtered and then allowed to stand until the bubbles are removed.

The solution is then coated on a support (glass, film, paper, etc.). The film is initially transparent and will remain so indefinitely when stored in the dark. Upon irradiation with an ultra-violet light source, the coating turns black and does not return to its original transparent state after removal of the incident energy. The film is irreversibly photothermotropic.

Example 2

The composition is prepared from the following reagents:

2($a$)—The polymer solution described in Example 1.
2($b$)—Silicotungstic acid crystal. ($SiO_2 \cdot 12WO_3 \cdot 26H_2O$).

| Solution No. | Solution Total | Solids | Percent Solids |
|---|---|---|---|
| 2($a$) | 12 | 1.2 | 40 |
| 2($b$) | | 1.8 | 60 |

Solid silicotungstic acid, 2($b$), is added to polyvinyl alcohol acetate solution, 2($a$). The combined mixture is shaken, mixed, debubbled and coated on a support. The film is relatively insensitive to ultra-violet but shows a sudden threshold in intense light at about 8 gm.-cals./cm.$^2$-min., with a maximum sensitivity of 1.4 (gm.-cals./cm.$^2$)$^{-1}$.

Example 3

The solutions described in the above examples are used with the following compositions:

| Solution No. | Solution Total | Solids | Percent Solids |
|---|---|---|---|
| 1($a$) | 40 | 4.0 | 40 |
| 1($b$) | 12 | 3.6 | 36 |
| 2($b$) | | 2.4 | 24 |

The phosphomolybdic acid 1($b$) is added to solution 1($a$). After mixing 2($b$) is added to the combined solution to produce a similarly acting photothermotropic film.

Example 4

Prepare the following solutions by shaking or mixing:

4($a$)—Polymersolution:

| | |
|---|---|
| Polyvinyl butyral | 10 |
| Methanol | 45 |
| N-propanol | 45 |
| | 100 |

B90—Shawinigan Resin Corp.

4($b$)—Heteropoly acid solution:
A solution comprising 30% phosphomolybdic acid and 70% n-propanol.

| Solution No. | Solution Total | Solids | Percent Solids |
|---|---|---|---|
| 4($a$) | 12 | 1.2 | 69.0 |
| 4($b$) | 1.8 | .54 | 31.0 |

The procedure in the above example is followed. A photothermotropic film is produced which is ultra-violet, infra-red and thermally sensitive.

Example 5

Same as Example 4 but substituting phospho-vanado-molybdic acid in 4($b$).

Example 6

5($a$)—Same as 4($a$)
5($b$)—A 50% solution of phosphomolybdic acid in n-propanol
5($c$)—Silicotungstic acid (solid reagent grade).

| Solution No. | Solution Total | Solids | Percent Solids |
|---|---|---|---|
| 5($a$) | 12 | 1.2 | 32.5 |
| 5($b$) | 3 | 1.5 | 40.5 |
| 5($c$) | | 1.0 | 27.0 |

The mixing procedure is as follows: No. 5($c$) is added to 5($a$) after mixing. 5($b$) is added to the combined solution. After mixing and debubbling the solution is ready for coating onto a suitable support. The film that is produced is infra-red and ultra-violet sensitive.

Examples 7–10

Photothermotropic layers for copy-sheets were prepared according to the following formulations:

| | Weight of Solids | Percent Solids |
|---|---|---|
| Example 7: | | |
| Phosphomolybdic acid (30% in propanol) | 0.54 | 31.0 |
| Polyvinyl butyral (10% in methanol) | 1.2 | 68.9 |
| Augmentor (optional) (1% Hydroquinone in propanol). | 0.0025 | 0.1 |
| Example 8: | | |
| Phosphomolybdic acid | 1.5 | 40.5 |
| Silicotungstic acid | 1.0 | 27.0 |
| Polyvinyl butyral | 1.2 | 32.5 |
| Example 9: | | |
| Phosphomolybdic acid (30% in propanol) | 9.0 | 74.8 |
| Polyvinyl butyral (10% in methanol) | 3.0 | 25.2 |
| Example 10: | | |
| Phosphomolybdic acid (50% in propanol) | 9.0 | 66.6 |
| Silicotungstic acid | 1.5 | 11.2 |
| Polyvinyl butyral (10% in methanol) | 3.0 | 22.2 |

The photothermotropic copy-sheet of the present invention is prepared in each case by first mixing the constituents of the photothermotropic composition in a suitable solvent. The mixture is then allowed to stand to eliminate bubbles and spun-coated on paper. The desired film thickness is obtained by increasing the number of coatings and by controlling the solution viscosity. Finally the film coated-paper is dried to provide the desired copy-paper.

The copy-sheet then is exposed to a high intensity light source; e.g. an ultra-violet source such as two backlite blue tubes No. F15T8–BLB, or run on a Thermofax machine which employs a high intensity infra-red lamp source, such as GE "T–3" lamp.

Certain additives may be included in the composition. These include small percentages of reducing augmentors, such as hydroquinone, thioacetamide, resorcinal and catechol.

The copy-sheet of the present invention is relatively stable to ambient light conditions after image development. Fading out or discoloring of the background or unexposed areas of the sheet carrying an image is relatively insignificant, even upon prolonged exposure to outdoor ambient or ultra-violet light.

The following examples will illustrate the invention more fully.

Example 11

A solution of 10 g. of polyvinyl butyral (Monsanto Chemical Co.) in 90 g. absolute methanol (10%) is first prepared. To 12 g. of this solution is added 1.8 g. of a solution of 30 g. of phosphomolybdic acid crystals, $P_2O_5 \cdot 24M_0O_3 \cdot xH_2O$, (Mallincrodt Chemical Co. AR) in 70 g. of propanol solvent (30%). To the solution thus formed is next added 0.25 g. of a solution of 1 g. hydroquinone in 99 g. propanol (1%). The combined solution then is coated onto a 1 mil "Terafilm." The resulting film is dried to form a photothermotropic copy-sheet. The mass per unit area of the coating is 0.45 mg./cm.$^2$. The solid content is 68.9% by weight polyvinyl butyral polymer, 31% by weight phosphomolybdic acid, and 0.1% by weight of hydroquinone.

A graphic image-bearing original sheet was placed, image side down, on an ordinary glass plate in a warmed-up thermographic copying machine ("Premier Model–19 Thermo-Fax," sold by Minnesota Mining and Mfg. Co.). Over the graphic original was placed a sheet of the photothermotropic copy-paper prepared above. After exposure at the number 1 setting of the thermographic copying machine, a clear dark image is produced.

Example 12

To 12 g. of a 10% solution of polyvinyl butyral in methanol is added 1.5 g. of phosphomolybdic acid and 1.0 g. of silicotungstic acid crystals ($SiO_2 \cdot 12WO_3 \cdot 26H_2O$) (Baker Analyzed Reagent). The combined solution then is coated on a 1 mil. terafilm support. The resulting film is dried to form a photothermotropic copy-sheet. The mass per unit area of the coating is 0.91 mg./cm.$^2$. The solid content of the coating is 32.5% by weight polyvinyl butyral polymer and 67.5% by weight heteropoly acids.

The copy-sheet thus produced is employed in a Thermofax machine to provide dark copies of a graphic original under conditions of Example 1.

Example 13

To 3.0 g. of a 10% solution of polyvinyl butyral in methanol is added 9.0 g. of phosphomolybdic acid as a 50% solution in propanol and 1.5 g. of silicotungstic acid. The combined solution then is coated on paper. The resulting film is dried to form a photothermotropic copy-sheet. The solid content of the coating is 22.2% by weight of polyvinyl butyral polymer, 66.6% by weight phosphomolybdic acid and 11.2% by weight silicotungstic acid.

A copy of graphic original was made using this photothermotropic copy-sheet from a No. F15T8–BCB ultraviolet light source.

Example 14

To 3.0 g. of polyvinyl butyral as a 10% solution in methanol is added 9.0 g. of phosphomolybdic acid as a 30% solution in propanol. The solution is then applied to a paper support and dried. The resultant copy-sheet has a solid content of 25.2% by weight polyvinyl butyral and 74.8% by weight of phosphomolybdic acid. Upon use in a commercial Thermofax machine a dark copy of a graphic original is obtained.

Example 15

To 1.2 g. of polyvinyl butyral as a 10% solution in methanol is added 0.54 g. of phosphomolybdic acid as a 30% solution in propanol. The solution is then applied to a paper support and dried. The resultant copy-sheet has a solid content of 69% by weight of polyvinyl butyral and 31% by weight of phosphomolybdic acid. When used in a commercial Thermofax machine a dark copy of a graphic original is obtained.

While this invention has been described in terms of certain preferred embodiments and specific examples, and illustrated by way of certain drawings, these are illustrative only, and many alternatives and equivalents will readily occur to those skilled in the art, without departing from the spirit and scope of the invention. The invention is therefore not to be construed as limited, except as set forth in the appended claims.

Having thus fully described the invention, what is claimed as new and desired to be secured by Letters Patent of the United States, is:

1. An irreversible photothermotropic composition comprising a solid solution of an inorganic polyacid selected from the group consisting of phosphomolybdic, and, phosphovanadomolybdic acids and mixtures thereof, and a polymer selected from the group consisting of polyvinyl butyral, polyvinyl alcohol acetate copolymers and mixtures thereof, said inorganic polyacid being present in amount from about 25 to about 80 percent and said polymer being present in amount from about 20 to about 75 percent, said percentages being by weight based on the combined weights of said polyacid and said polymer.

2. An irreversible photothermotropic composition comprising from about 25 to about 80 percent by weight of an inorganic polyacid selected from the group consisting of phosphomolybdic, and phosphovanadomolybdic acids and mixtures thereof, and from about 20 to about 75 percent by weight of a polyvinyl alcohol-acetate copolymer.

3. An irreversible photothermotropic composition comprising from about 25 to about 80 percent by weight of an inorganic polyacid selected from the group consisting of phosphomolybdic, and, phosphovanadomolybdic acids and mixtures thereof, and from about 20 to about 75 percent by weight of a polyvinyl butyral.

4. An irreversible photothermotropic composition comprising a solid solution of from about 25 to about 80 percent by weight of phosphomolybdic acid and from about 20 to about 75 percent by weight of a polymer selected from the group consisting of polyvinyl butyral, polyvinyl alcohol-acetate copolymers and mixtures thereof.

5. An irreversible photothermotropic article comprising in combination a support and a photothermotropic coating, said photothermotropic coating comprising from about 25 to about 80 percent by weight of an inorganic polyacid selected from the group consisting of phosphomolybdic, and phosphovanadomolybdic acids and mixtures thereof, and from about 20 to about 75 percent by weight of a polyvinyl butyral.

6. An irreversibly photothermotropic article comprising in combination a transparent support and a photothermotropic coating, said photothermotropic coating comprising from about 25 to about 80 percent by weight of an inorganic polyacid selected from the group consisting of phosphomolybdic, and phosphovanadomolybdic acids and mixtures thereof, and from about 20 to about 75 percent by weight of a polyvinyl butyral.

7. An irreversibly photothermotropic article comprising in combination a paper-like support and a photothermotropic coating, said photothermotropic coating comprising from about 25 to about 80 percent by weight of an inorganic polyacid selected from the group consisting of phosphomolybdic, and phosphovanadomolybdic acids and mixtures thereof, and from about 20 to about 75 percent by weight of a polyvinyl butyral.

References Cited by the Examiner

UNITED STATES PATENTS

| | | | |
|---|---|---|---|
| 2,855,300 | 10/1958 | Chalkley | 96—48 |
| 2,895,892 | 7/1959 | Chalkley | 96—90 X |
| 2,981,622 | 7/1959 | Chalkley | 96—90 X |
| 3,169,064 | 2/1965 | Levy | 96—88 X |

NORMAN G. TORCHIN, *Primary Examiner.*

D. D. PRICE, *Assistant Examiner.*